(12) United States Patent
Weber

(10) Patent No.: US 8,468,674 B2
(45) Date of Patent: Jun. 25, 2013

(54) DEVICE AND METHOD FOR SUPPLYING STRUCTURAL COMPONENTS TO AN ASSEMBLY ZONE

(75) Inventor: Frank Weber, Jork (DE)

(73) Assignee: Airbus Operations GmbH, Hamburg (DE)

( * ) Notice: Subject to any disclaimer, the term of this patent is extended or adjusted under 35 U.S.C. 154(b) by 510 days.

(21) Appl. No.: 12/627,491

(22) Filed: Nov. 30, 2009

(65) Prior Publication Data

US 2010/0135754 A1 Jun. 3, 2010

Related U.S. Application Data

(60) Provisional application No. 61/119,234, filed on Dec. 2, 2008.

(51) Int. Cl.
*B21D 39/03* (2006.01)
*B65G 49/00* (2006.01)

(52) U.S. Cl.
USPC ........................................ 29/430; 414/222.04

(58) Field of Classification Search
USPC ............ 29/430, 428, 743, 281.1, 56.6, 281.5, 29/897.2; 414/222.04; 269/37, 287, 288, 269/42
See application file for complete search history.

(56) References Cited

U.S. PATENT DOCUMENTS

| | | | |
|---|---|---|---|
| 6,003,812 A | 12/1999 | Micale et al. | |
| 6,408,517 B1 | 6/2002 | Lehmker et al. | |
| 8,146,222 B2 | 4/2012 | Frauen et al. | |
| 2005/0184194 A1 | 8/2005 | Schaefer et al. | |
| 2006/0162140 A1 * | 7/2006 | Frauen et al. | 29/407.04 |
| 2006/0182557 A1 | 8/2006 | Frauen et al. | |

FOREIGN PATENT DOCUMENTS

| | | |
|---|---|---|
| DE | 69331430 | 11/2002 |
| DE | 10 2004 056 285 | 5/2006 |
| DE | 10 2004 056 286 | 5/2006 |
| EP | 1658928 | 5/2006 |
| FR | 2788743 | 7/2000 |

OTHER PUBLICATIONS

German Office Action for Application No. 10 2008 044 262.3 dated Oct. 4, 2012.

* cited by examiner

*Primary Examiner* — John C Hong
(74) *Attorney, Agent, or Firm* — Jenkins, Wilson, Taylor & Hunt, P.A.

(57) ABSTRACT

A device for the preferably automated supply of structural components to an assembly zone for producing a fuselage portion of an aircraft by multi-shell construction is provided and can include at least one side shell support for introducing at least one side shell, and at least two positioning towers for moving and aligning at least one side shell inside device. The device enables side shells to be quickly and precisely supplied to an assembly zone for production of an entire fuselage portion. It is possible to dispense completely with the hitherto required manual and therefore time-consuming "hovering" of side shells and other large structural components, such as upper shells, lower shells, floor frames and other technical equipment systems necessary for the production of a fuselage portion, this process being prone to problems and difficult to control.

14 Claims, 5 Drawing Sheets

DEVICE AND METHOD FOR SUPPLYING
STRUCTURAL COMPONENTS TO AN
ASSEMBLY ZONE

CROSS-REFERENCE TO RELATED APPLICATIONS

This application claims the benefit of U.S. Provisional Application No. 61/119,234, filed Dec. 2, 2008, the entire disclosure of which is herein incorporated by reference.

FIELD OF THE INVENTION

The invention relates to a device for the preferably automated supply of structural components, in particular of at least two side shells, to an assembly zone for production of a fuselage portion of an aircraft by multi-shell construction.

In modern aircraft construction, what is known as sectional construction is becoming increasingly common. A plurality of fuselage portions is assembled behind one another in order to form the finished aircraft fuselage cell. The fuselage portions themselves are usually produced by multi-shell construction, irrespective of whether composite materials or conventional aluminium construction is used. For example, two side shells together with an upper shell and a lower shell as well as at least one floor frame are pre-assembled to form a fuselage portion. The fuselage portions are preferably integrated in an assembly zone. Nowadays, the structural components are usually introduced into the assembly zone using manually operable overhead cranes. This individual handling of the structural components in the assembly zone is extremely challenging owing to the mechanical lability involved and the large size of the structural components, this handling process also being highly time-consuming.

SUMMARY OF THE INVENTION

The object of the invention is therefore to supply structural components to a complex assembly zone in a fully automated manner for producing fuselage portions, while at the same time the number of retaining members to be provided at the side shells is kept to a minimum.

This object is achieved by a device according to claim 1 which comprises the following features:
a) at least one side shell support for introducing at least one side shell,
b) at least two positioning towers for moving and aligning at least one side shell inside the device.

Owing to the fact that the side shells have already been placed on a suitable side shell support by the manufacturer, they can automatically be brought to the assembly zone in a defined position and then transferred from the side shell support by the positioning towers. For this purpose, the positioning towers have a plurality of positioning arms which are equipped with connection members which use different technology and retain the side shells. Generally, the positioning towers can each be moved independently of one another and parallel to the longitudinal axis of the fuselage portion, i.e. parallel to an x-axis of the assembly zone.

In accordance with an advantageous development of the device, at least two positioning towers are provided in each case on either side of the at least one side shell support. The large and thus mechanically labile side shells are thus retained securely and can be positioned in a sufficiently precise manner. Irrespective of the size of the side shells, the device preferably has six positioning towers, of which three are arranged within the assembly zone in each case on either side of the fuselage portion to be produced. By means of the positioning towers, two side shells which mirror one another can be spatially positioned in a largely free manner within the assembly zone.

In accordance with the features of a further advantageous embodiment, it is provided for the at least one side shell support to comprise a plurality of grippers for retaining the side shell on its inner surface, the grippers being centrally actuatable by an actuation member. By means of the grippers, the side shells delivered on the side shell supports are securely fixed in place and can be transported without difficulty. The central actuation member enables the side shell support to be advantageously integrated into the fully-automated production processes taking place inside the device.

A further development of the device provides for each positioning tower to have at least three positioning arms. Consequently, there are more opportunities for the spatial positioning of the side shells since the positioning arms themselves can be moved independently of one another at least parallel to the y-axis of the assembly zone. Furthermore, the positioning arms can be optimally adapted to any curvature of the side shells, if necessary to a curvature of the side shell which varies in regions, by extending over varying distances.

In accordance with the features of a further advantageous embodiment of the device, it is provided for there to be at least one connection member on the end of each positioning arm. By means of the connection members, the side shells are mechanically fastened to the positioning towers with no clearance and are accurately secured in their spatial position, undesired deformations of the side shells owing to their dead weight being avoided.

The connection member is advantageously configured as a ball socket. In conjunction with a ball arranged on the side shell as a fixing point, clearance-free mounting is ideally achieved which still allows the side shells to move slightly in a cardanic manner relative to the positioning tower. Each side shell to be handled by the device preferably has three retaining members in the form of a ball socket.

A further advantageous embodiment of the device provides for the at least one connection member to be a vacuum system which cooperates with an outer surface of the at least one side shell. Consequently, the number of retaining members arranged rigidly on the side shells is reduced since the side shell can be directly suctioned by means of the vacuum system. The vacuum system is preferably a matrix of suckers which are arranged on a suction plate which is in turn connected to a retaining plate in a cardanic manner, which retaining plate is connected to a respective end of a positioning arm.

In accordance with the features of a further advantageous embodiment of the device, it is provided for each side shell to comprise, in the region of its outer surface, at least two retaining members, in particular ball supports and/or ball pins, which can each be engaged with a ball socket of a positioning arm. It is thus possible to couple the side shell to the respective positioning arms of the positioning towers with no clearance, it still being possible for the ball pins or balls to pivot slightly in the respective associated ball socket of the positioning arm, in such a way that mechanical stresses can be largely compensated.

Further advantageous embodiments of the device are given in further claims.

Furthermore, the object according to the invention is achieved by a method according to the features of claim 11, comprising the following steps:
a) introducing into and aligning in the device at least one side shell support comprising at least two side shells, b) transferring the at least two side shells to at least two positioning towers in each case, c) removing the side shell support from the device, and d) moving the positioning towers into a stand-by position.

Owing to the fact that the side shells have already been placed on a side shell support by the manufacturer, they can be aligned inside the device in a highly accurate manner in method step a). Since each of the side shells is transferred in method step b) to at least two positioning towers, the side shells can be largely freely positioned and aligned inside the device. The removal of the side shell support in method step c) provides space so that further subsequent method steps, such as the attachment of other structural components to the two side shells, can be carried out inside the device. In the final method step d), the positioning towers are brought into a stand-by position in order to facilitate the introduction of further structural components, for example an upper shell, a lower shell and at least one floor frame, which are needed in order to complete an entire fuselage portion.

Further advantageous embodiments of the method are disclosed in the further claims.

DESCRIPTION OF EXEMPLARY EMBODIMENTS

Figure 1:
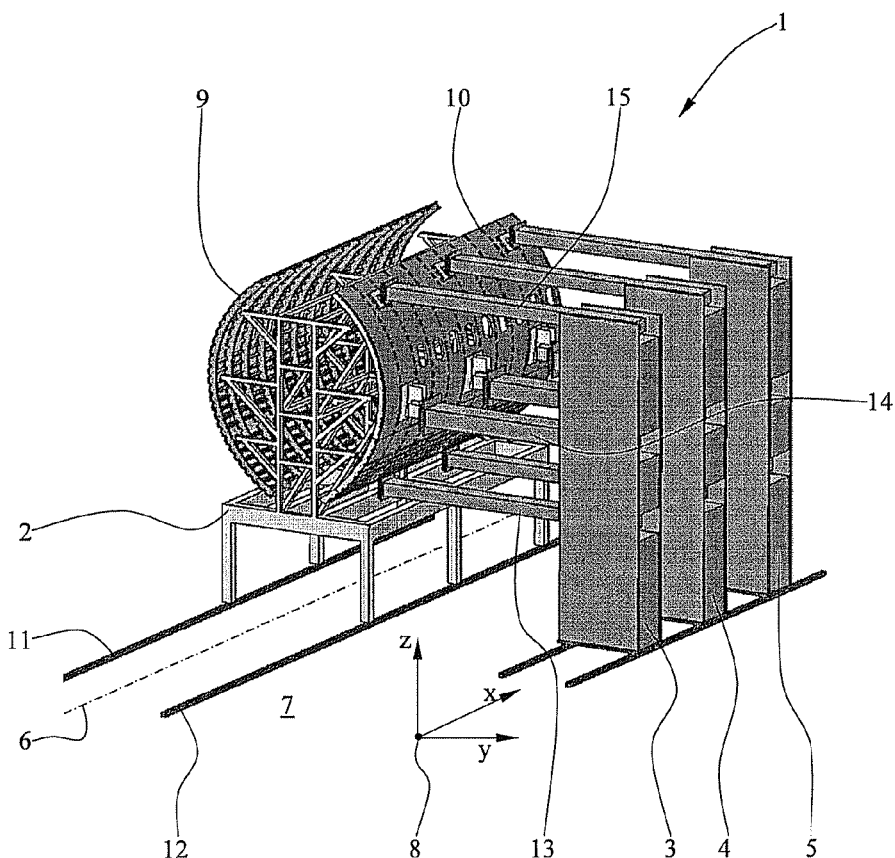
FIG. 1 is a perspective view of a right-hand part of a device comprising three positioning towers, a side shell support and two side shells received on said support.

In the drawings, like structural components are denoted by like reference numerals.

FIG. 1 is a perspective view of a right-hand part of a device. A device 1 comprises, inter alia, a side shell support 2 and three positioning towers 3 to 5 which are arranged on the right-hand side of a central line 6 in an assembly zone 7. A coordinate system 8 illustrates the spatial position of the components. In accordance with the positioning towers 3 to 5, the same number of positioning towers is arranged symmetrically to the central line 6, but these towers are not shown for reasons of clarity. Two side shells 9, 10 are received on the side shell support 2 and are provided for production of a fuselage portion (not shown) so as to create an aircraft fuselage cell. The side shell support 2 and the positioning towers 3 to 5 can be moved and positioned on rails, of which only two rails 11, 12 are provided with a reference numeral, in order to displaceably mount the side shell support 2 in a highly accurate manner and parallel to the x-axis of the coordinate system 8 using a control and/or adjusting means (not shown). Alternatively, the side shell support 2 may also be moved using an underfloor vehicle which is freely moveable within the assembly zone 7.

In the embodiment shown, three positioning arms 13 to 15 are arranged on the front positioning tower 3 and can be moved independently of one another in a highly accurate manner at least parallel to the y-axis of the coordinate system 8, controlled by the control and adjusting means. The positioning towers 4, 5 are each also equipped with three positioning arms which have not been denoted by reference numerals for reasons of clarity. At the ends of the positioning arms 13 to 15 pointing in the direction of the side shells 9, 10, there are connection members for mechanical (but also releasable, if necessary) connection of the side shells 9, 10 to the positioning towers 3 to 5.

Figure 2:
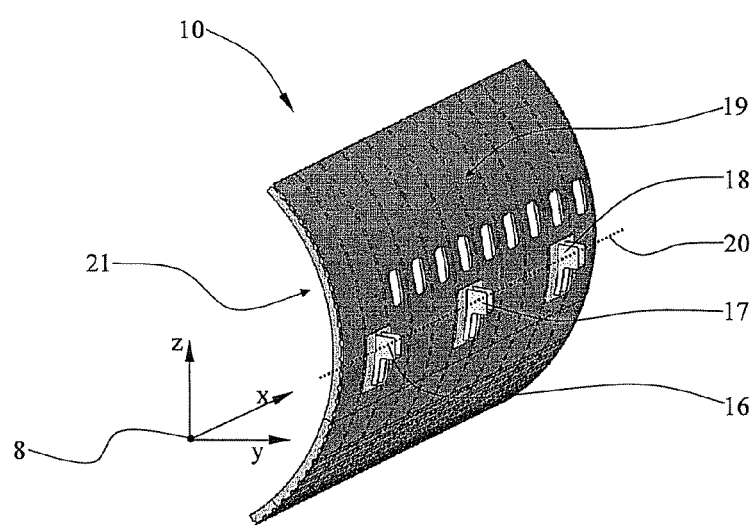
FIG. 2 is a spatial view of a side shell comprising three retaining members.

FIG. 2 is a slightly enlarged view of the side shell 10 of FIG. 1. The side shell 10 is equipped with a total of three retaining members 16 to 18, which are arranged offset behind one another in the region of an outer surface 19 level with a line 20. A distance between the retaining members 16 to 18 is preferably selected so as to be approximately uniform. Depending on the size of a side shell 10, a different number of retaining members 16 to 18 may be necessary. Similarly, if a side shell is of another shape, it may be necessary for the retaining members 16 to 18 to be arranged above and/or below the line 20 extending approximately centrally relative to the outer surface 19 of the side shell 10. The retaining members 16 to 18 are statically dimensioned in such a way that a fuselage portion produced with two side shells 9, 10 as well as other structural components, for example an upper shell, a lower shell, a floor frame and other equipment components, can be lifted and spatially positioned freely using these retaining members alone. Retaining webs which are concealed in FIG. 2 are arranged the region of an inner surface 21 of the side shell 10, longitudinal axes of the retaining webs extending parallel to the x-axis of the coordinate system 8.

Figure 3:
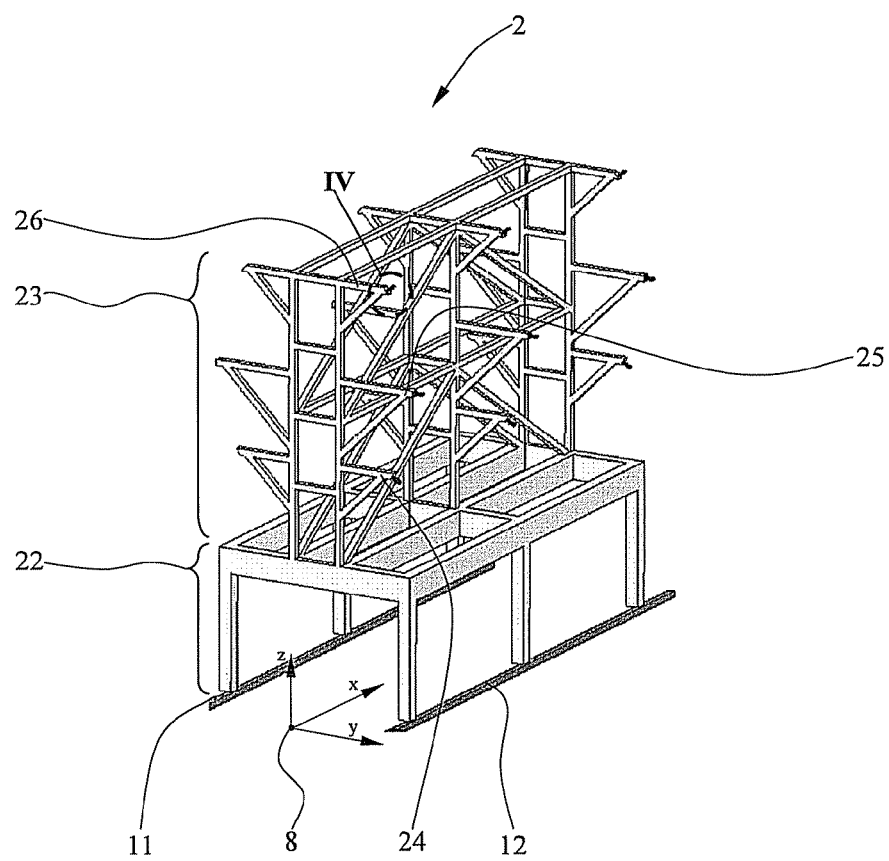
FIG. 3 is a perspective view of a side shell support.

FIG. 3 is an enlarged view of the side shell support 2 of FIG. 1. The side shell support 2 comprises, inter alia, a lower frame 22 on which a retaining frame 23, braced in the manner of latticework, is arranged, for example in order to fix in position two side shells which mirror one another. The lower framer 22 has six supporting legs which are not provided with a reference numeral and at the lower end of each of which a running wheel (not shown) is arranged in order to allow the side shell support 2 to be moved and guided in the rails 11, 12. The lower frame 22 and the retaining frame 23 may be formed in one piece. Alternatively, it is possible for the retaining frame 23 to be releasable from the lower frame 22 so as to enable the device 1 to quickly be adapted to side shells 9, 10 of a different shape. Furthermore, actuators (not shown) are provided in order to enable the side shell support 2 to be accurately positioned on the two rails 11, 12 parallel to the x-axis of the coordinate system 8. On either side, the retaining frame 23 has nine cantilever arms which mirror one another and of which only the three front cantilever arms 24 to 26 are provided with a reference numeral which is representative of all the other cantilever arms. The cantilever arms are each supported on the retaining frame 23 downwards by an inclined support. A gripper is arranged at each outwardly-pointing end of the cantilever arms. The grippers grasp and retain the side shells 9, 10 arranged on the side shell support 2. For this purpose, a large number of retaining webs are arranged on the inner surface of the side shells 9, 10 in the regions in which the grippers are disposed. For example, the retaining webs may be temporarily fixed to the inner surface of the side shells 9, 10 by a known fork mounting. The grippers are configured in such a way that they comprise one or two pivotable gripping arms which enable a positive connection, at least in regions, with the retaining webs. Furthermore, the side shell support 2 has a mechanism (not shown) by means of which all the grippers can be actuated centrally and simultaneously via a central actuation member. For example, the actuation member may be a lever which pivots the gripping arms via a downstream lever mechanism. The grippers can be locked or unlocked, for example manually by releasing the central actuation member. Alternatively, the actuation member may also be released using an actuator, for example in the form of a servomotor, which may be controlled by the control and adjusting means. Both the lower frame 22 and the retaining frame 23 are formed using a steel alloy.

Figure 4:
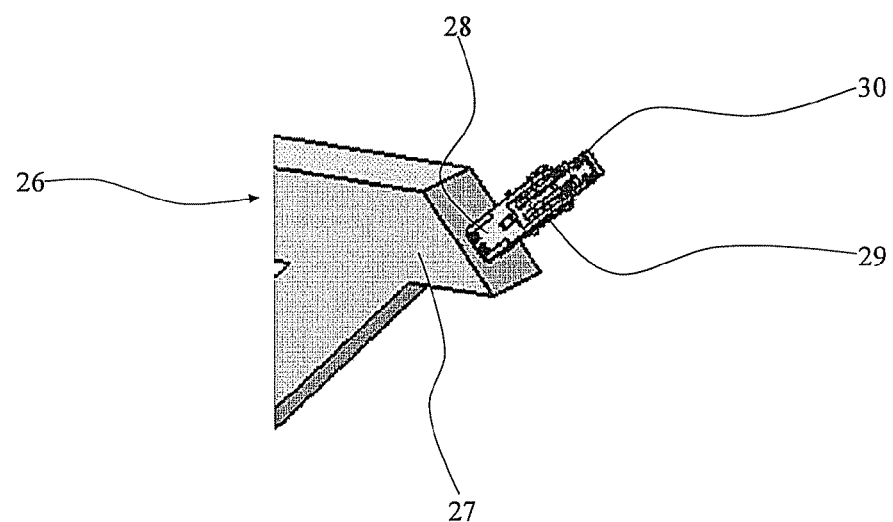
FIG. 4 is a view of a detail IV of FIG. 3.

FIG. 4 shows an enlarged view of the circular detail IV of FIG. 3. A gripper 28 comprising two gripping arms 29, 30 is fixed to an end 27 of the cantilever arm 26 (see FIG. 3). It is not possible to position the gripper 28 relative to the side shell support 2. The gripper arms 29, 30 may be pivoted towards one another or away from one another using a drive mechanism or an actuator (not shown) in order to encompass, with as little clearance as possible, a cylindrical retaining web which is fixed in the region of an inner surface of the side shell.

Figure 5:
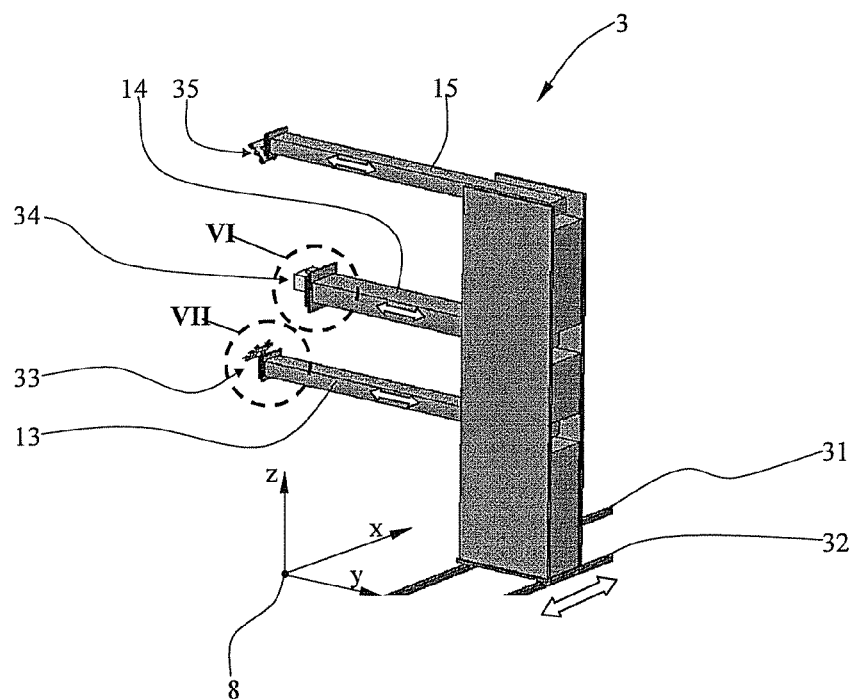
FIG. 5 is a perspective view of a positioning tower comprising three positioning arms.

FIG. 5 is an enlarged view of the positioning tower 3 of FIG. 1. The positioning tower 3 may be moved parallel to the x-axis of the coordinate system 8 on two rails 31, 32. Actuators (not shown), for example in the form of electric servomotors which are actuated by the control and adjusting means, are used to effect this movement. Furthermore, the positioning arms 13 to 15 are arranged on the positioning tower 3. Said positioning arms may each be received so as to move independently of one another and parallel to the y-axis of the coordinate system 8. Alternatively, the positioning arms 13 to 15 may also be displaceable parallel to the z-axis so as to adapt quickly to side shells having a different radius of curvature. A connection member 33 to 35 is arranged in each case in the region of the ends of the positioning arms.

Figure 6:
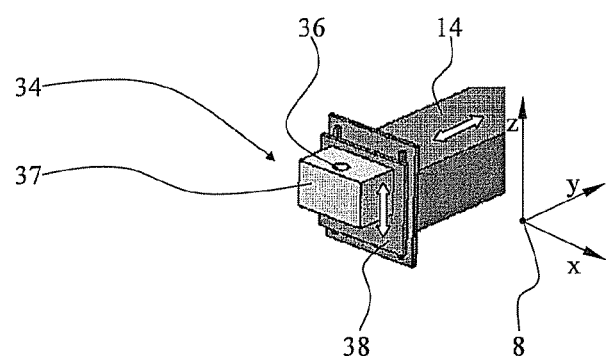
FIG. 6 is an isolated view of the detail VI of FIG. 5.

FIG. 6 is an enlarged view of the circular detail VI of FIG. 5. A ball socket 36 acts as a connection member 34 at the positioning arm end (not referenced) of the positioning arm 14. A ball or a ball pin of a retaining member 16 to 18 fixed to the outer surface of the side shell 10 may be positively received, at least in regions, in said ball socket 36. Owing to this conditionally articulated connection between the ball socket 36 and the ball or ball pin, there is limited pivotability between the side shell 10 and the positioning tower 3. The ball socket 36 is arranged in a solid block 37 which is fixed to a retaining plate 38. In the embodiment shown, the retaining plate 38 can be displaced at least parallel to the z-axis of the coordinate system 8. The retaining plate 38 is also displaced by means of actuators (not shown) which are in turn controlled by the control and adjusting means. Furthermore, load sensors (not shown) are arranged in the region of the positioning arm 14 in order to detect, as precisely as possible, the mechanical forces acting on the ball socket 36.

Figure 7:
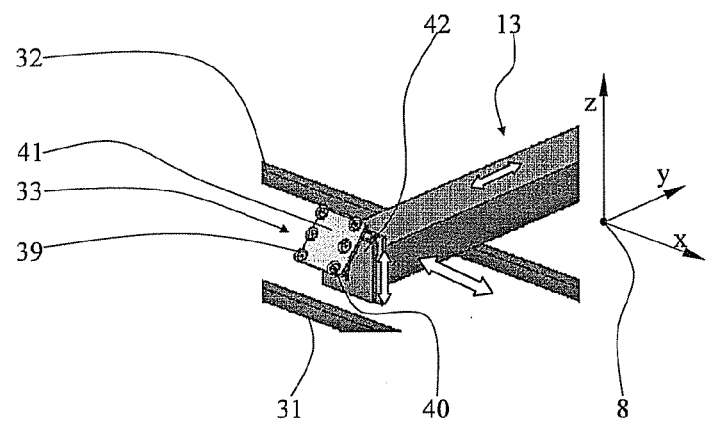
FIG. 7 is an isolated view of the detail VII of FIG. 5.

FIG. 7 is an enlarged view of the circular detail VII of FIG. 5. In contrast to the connection member 34, the connection member 33 arranged on the lower positioning arm 13 has a vacuum system comprising a total of six suckers, of which only the suckers 39 and 40 are provided with a reference numeral. The suckers are arranged in two parallel rows, each comprising three suckers on a suction plate 41. In order to increase the suction power of the connection member 33 and/or reliability, an arrangement and number of suckers which deviates from the illustration shown may be provided. The arrangement of at least one sucker on each lower and upper positioning arm is sufficient to apply the necessary retaining force. As shown in FIG. 7, it is preferable for at least six suckers to be provided on each suction plate of the respective positioning arm. The suction plate 41 is articulated on a retaining plate 42 in a cardanic manner, said retaining plate 42 in turn being connected to a positioning arm end of the positioning arm 13. The retaining plate 42 may be moved at least parallel to the z-axis of the coordinate system using servomotors (not shown). With reference to FIG. 7, the two rails 31, 32 extend beneath the positioning arm 13. The structure of the upper connection member 35 corresponds to that of the aforementioned connection member 33 and also contains a vacuum system.

The cardanic articulation between each of the suction plates 41 comprising suckers arranged thereon and the respective positioning arms 13 and 15 enables the positioning tower 3 to be flexibly adapted to side shells 9, 10 having radii of curvature which differ in regions. By using a vacuum system on the upper and lower positioning arms 13, 15 of the positioning towers 3 to 5, only three retaining members per side shell 9, 10 are required in order to fix the position of the side shell 10 inside the device 1 in a sufficiently reliable manner.

The options for moving the individual components in FIGS. 5 to 7 are indicated by white double-headed arrows in addition to the coordinate system 8.

Figure 8:
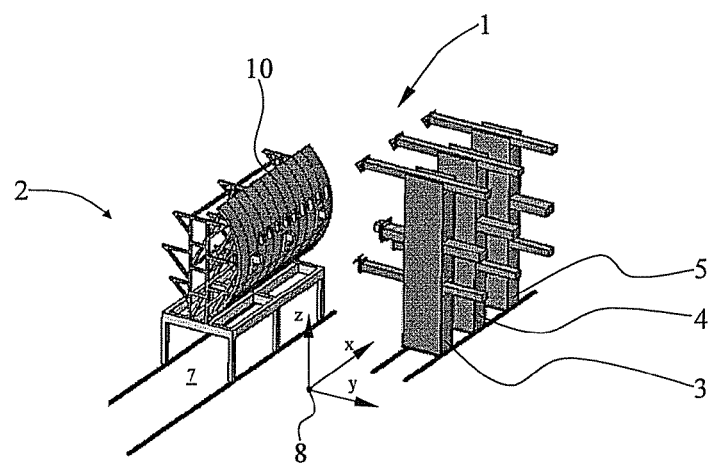
FIGS. 8 to 12 are largely schematic views of the course of the method according to the invention.
Figure 9:
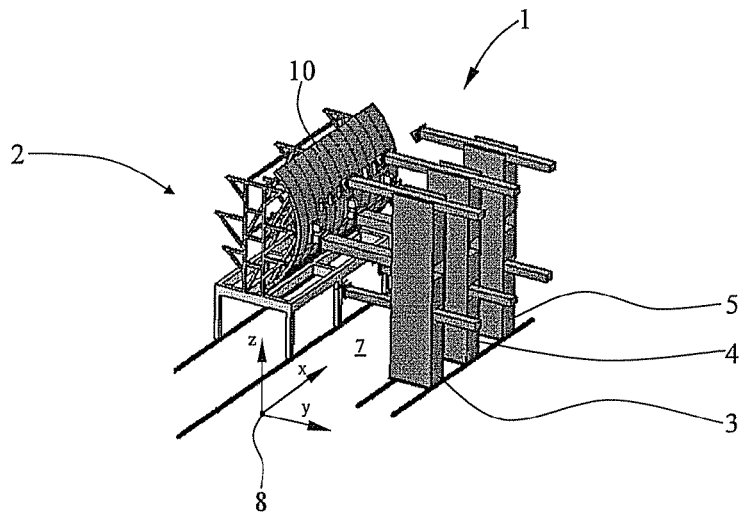
Figure 10:
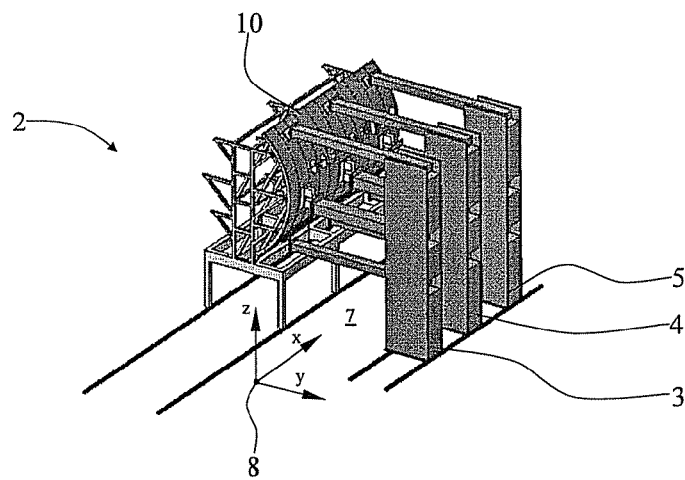
Figure 11:
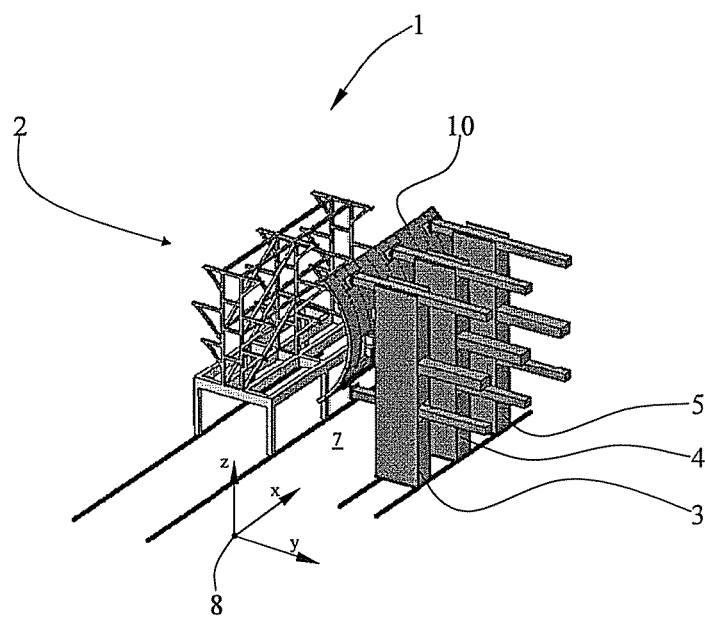
Figure 12:
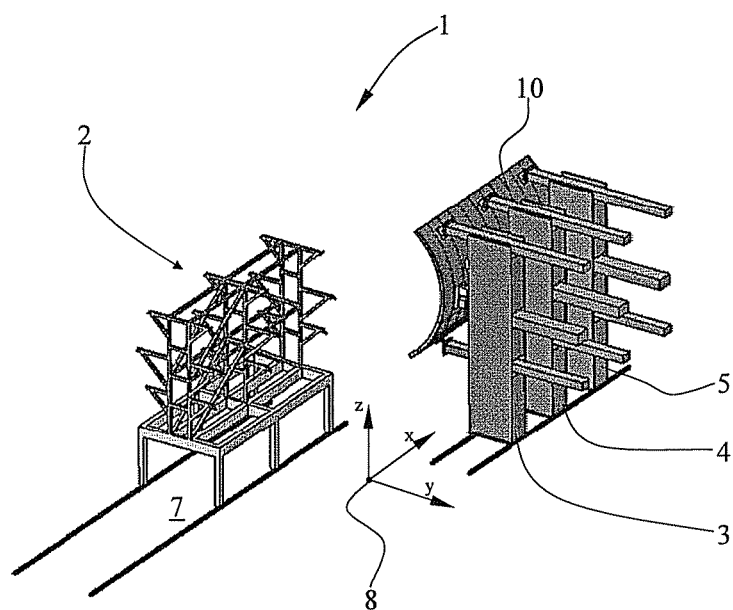

FIGS. 8 to 12, which will be referred to together in the following description, schematically show the course or use of the device 1 according to the invention for supplying side shells 9, 10 to an assembly zone 7. With reference to FIG. 8, the side shell 10 is arranged on the side shell support 2 in a position which is largely completely removed from the assembly zone 7 or the device 1, whilst with reference to FIG. 9 the side shell support 2 has completely entered the assembly zone 7 and is aligned precisely relative to the positioning towers 3 to 5. With reference to FIG. 10, the positioning arms are arranged against the side shell 10. In this case, a vacuum is applied to the suckers of the vacuum system of the upper and lower positioning arms and the connection members are positively connected, at least in regions, to the retaining members on the side shell 10 in the region of the central positioning arms. In this state, the side shell 10 is retained both by the side shell support 2 and by all nine positioning arms of the three positioning towers 3 to 5. Once the positioning arms have been mechanically coupled to the side shell 10, the grippers 28 of the side shell support 2 may be released, the side shell 10 thus being completely transferred to the positioning towers 3 to 5. With reference to FIG. 11, the positioning arms are then retracted in a synchronised manner in the direction of the y-axis and the side shell support 2, as shown in FIG. 12, is removed from the device against the direction of the x-axis of the coordinate system 8. The aforementioned procedure of introducing the side shell 10 into the device 1 or the assembly zone 7 takes place at the same time as that of a side shell 9 which mirrors the side shell 10 and is also fixed on the side shell support 2 and transferred to the other three positioning towers (not shown) which are arranged opposite each of the positioning towers 3 to 5.

Furthermore, there are other positioning devices (not shown in the figures) for aligning further structural components, for example upper shells, lower shells and floor frames, relative to the side shells 9, 10 fixed on the positioning towers and by means of which positioning devices an entire fuselage portion of an aircraft fuselage cell may be assembled in a preferably fully automated manner. These positioning devices may be, for example, positioning towers which may be configured in accordance with the positioning towers described above so as to comprise retractable positioning arms. However, positioning gantries may also be conceivable which can pass over the positioning towers arranged on either side, for example so as to align a lower shell and/or an upper shell irrespective of the movements of the positioning towers.

List of Reference Numerals 1 device
2 side shell support 3 positioning tower
4 positioning tower
5 positioning tower
6 central line
7 assembly zone
8 coordinate system
9 side shell
10 side shell
11 rail
12 rail
13 positioning arm
14 positioning arm
15 positioning arm
16 retaining member
17 retaining member
18 retaining member
19 outer surface (side shell)
20 line
21 inner surface (side shell)
22 lower frame
23 retaining frame
24 cantilever arm
25 cantilever arm
26 cantilever arm
27 end of cantilever arm
28 gripper
29 gripping arm
30 gripping arm
31 rail
32 rail
33 connection member
34 connection member
35 connection member
36 ball socket
37 block
38 retaining plate
39 sucker
40 sucker
41 suction plate
42 retaining plate

The invention claimed is:

1. A device for an automated supply of at least two side shells, to an assembly zone for producing a fuselage portion of an aircraft by multi-shell construction, comprising:
   a) at least one side shell support adapted to receive at least one side shell for introducing at least one side shell to the assembly zone, wherein the side shell support is arranged on rails and is adapted to move the at least one side shell from a position removed from the assembly zone to a position in the assembly zone,
   b) at least two positioning towers for moving and aligning at least one side shell inside the device.

2. The device according to claim 1, wherein at least two positioning towers are provided in each case on either side of the at least one side shell support.

3. The device according to claim 1, wherein the at least one side shell support comprises a plurality of grippers for retaining the at least one side shell on its inner surface, the grippers being centrally actuatable by an actuation member.

4. The device according to claim 1, wherein each positioning tower comprises at least three positioning arms.

5. The device according to claim 4, wherein there is at least one connection member at the end of each positioning arm.

6. The device according to claim 5, wherein the at least one connection member is a ball socket.

7. The device according to claim 5, wherein the at least one connection member is a vacuum system which cooperates with an outer surface of the at least one side shell.

8. The device according to claim 7, wherein each side shell comprises, in the region of its outer surface, at least two ball supports and/or ball pins, which can each be positively engaged, at least in regions, with a ball socket of a positioning arm.

9. The device according to claim 1, wherein the at least two side shells together with an upper shell, a lower shell and at least one floor frame, can be assembled in the device to form a fuselage portion.

10. The device according to claim 1 wherein an entire fuselage portion can be handled by at least four retaining members and at least four positioning towers.

11. A method for handling side shells, by a device according to claim 1, the method comprising the following steps:
   a) introducing into and aligning in the device at least one side shell support comprising at least two side shells, the side shell support being adapted to introduce the at least two side shells to the assembly zone, wherein the at least one side shell support is arranged on rails and is adapted to move the at least two side shells from a position removed from the assembly zone to a position in the assembly zone,
   b) transferring the at least two side shells to at least two positioning towers in each case,
   c) removing the side shell support from the device, and
   d) moving the positioning towers into a stand-by position.

12. The method according to claim 11, wherein the side shell support comprises a plurality of grippers for gripping and retaining the at least two side shells on the inner surface thereof, and each side shell is provided with at least two retaining members which can each be engaged with a connection member arranged on a positioning arm of a positioning tower, the grippers only being released once all retaining members are engaged with the connection members.

13. The method according to claim 12, wherein once a positive connection, at least in regions, has been produced between the retaining members on the side shells and associated connection members on the positioning arms, further positioning arms comprising a vacuum system as a connection member are operatively connected to outer surfaces of the side shells for additional secure positioning.

14. The method according to claim 11, wherein once the side shell support has been removed from the device, at least one upper shell, at least one lower shell and at least one floor frame, are introduced so as to provide a fuselage portion by connecting these structural components to the at least two side shells.

* * * * *